May 8, 1923. 1,454,379
W. I. INGLEDUE
STEERABLE VEHICLE LIGHT
Filed March 3, 1922
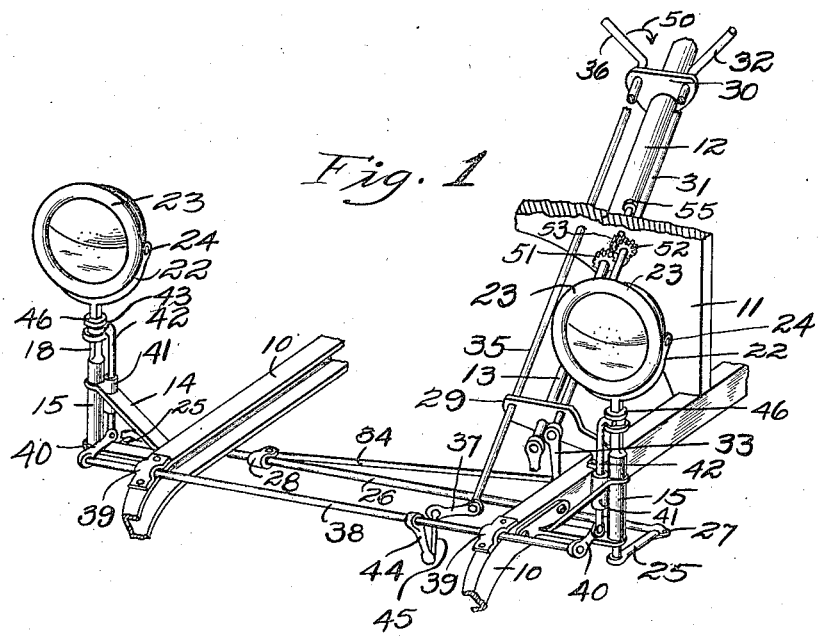
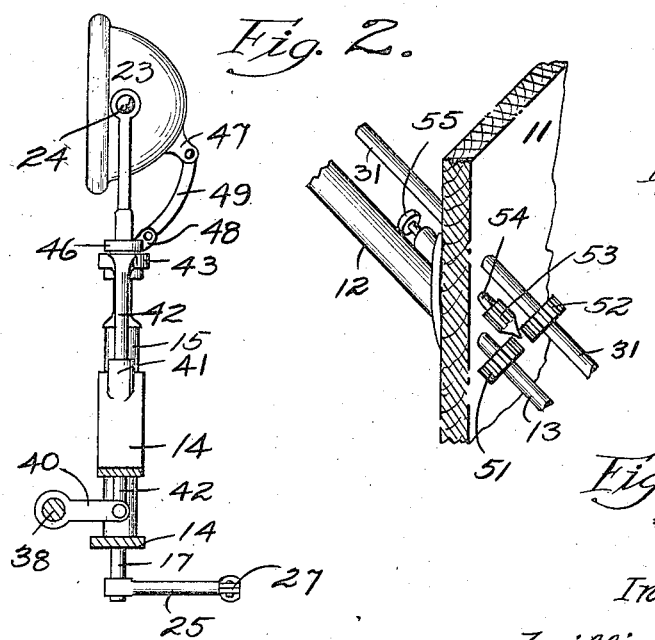
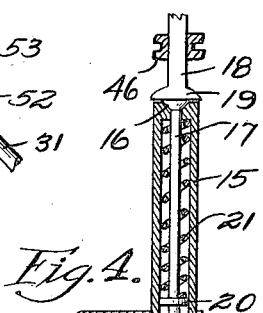
Inventor
William I. Ingledue
By Bair & Freeman
Witness
Lynn Latta Patented May 8, 1923.

1,454,379

UNITED STATES PATENT OFFICE.

WILLIAM I. INGLEDUE, OF MELBOURNE, IOWA.

STEERABLE VEHICLE LIGHT.

Application filed March 3, 1922. Serial No. 540,791.

*To all whom it may concern:*

Be it known that I, WILLIAM I. INGLEDUE, a citizen of the United States, and a resident of Melbourne, in the county of Marshall and State of Iowa, have invented a certain new and useful Steerable Vehicle Light, of which the following is a specification.

The object of my invention is to provide steerable vehicle lights of simple, durable and comparatively inexpensive construction.

More particularly my invention relates to a pair of steerable headlights capable of rotation on a vertical axis and tilting movement on a horizontal axis, the parts being so arranged that the rotation of the vehicle lights on a vertical axis may be accomplished manually or may be automatically accomplished by operation of the steering mechanism of the vehicle.

Still another object is to provide means for operatively connecting the vehicle lights with the steering mechanism, whereby they may be operated either in unison therewith, or independently thereof if so desired.

Still another object is to so arrange the vehicle lights that the tilting movement and rotating movement may be accomplished simultaneously or independently.

With these and other objects in view, my invention consists in the construction, arrangement and combination of the various parts of my device, whereby the objects contemplated are attained, as hereinafter more fully set forth, pointed out in my claims, and illustrated in the accompanying drawings, in which:

Figure 1 is a perspective view of a portion of a vehicle frame with my improved steerable headlights shown thereon.

Figure 2 is a side elevation of one of the vehicle lights.

Figure 3 is a detail perspective view of the means for connecting the steering mechanism of the vehicle to the control lever for operating the head lights; and Figure 4 is a detail sectional view taken through one of the vehicle light supports.

In the accompanying drawings I have used the reference numeral 10 to indicate, generally, a vehicle frame, which is provided with a dash 11 and a steering post 12. A steering rod 13 is arranged within the post 12 and operates the wheels of an automobile in the ordinary manner. The parts just described are of the ordinary construction now used.

I mount the vehicle lights on a pair of frames or brackets 14 which are extended out from the sides of the frame 10. Mounted within each of the brackets 14 is a cylindrical casing 15. The casing 15 is provided with a beveled surface opening 16 in its upper edge. A rod 17 is received within each of the casings 15, which rod 17 is provided with a squared portion 18 projecting up above the casing 15. The rod 17 is provided with an enlarged portion 19 which rests upon the upper end of the casing 15. A small washer 20 is fixed to the rod 17 near the lower end thereof so that a coil spring 21 may be received on the rod 17 and within the casing 15, as clearly illustrated in Figure 3 of the drawings.

The upper end of the squared portion 18 of the rod 17 is formed with a yoke 22. Received within the yoke 22 is a vehicle light 23. The vehicle light 23 is secured to the yoke 22 by means of the pivotal connections 24.

The vehicle light 23 is capable of tilting movement on the horizontal axis which is formed by the pivotal connections 24. From the construction of the parts just described, it will be seen that the entire rod 17 is free to rotate within the casing 15, for rotating the vehicle lights 23 on a vertical axis. Fixed to each of the lower ends of the rods 17 and extending rearwardly therefrom is a link 25. Each of the free ends of the links 25 are connected together by a tie rod 26. The tie rod and links 25 are provided with coacting ball and socket joints 27. A clevis 28 is fixed to the tie rod 26.

A bracket 29 is fixed on one side of the frame 10 and a bracket member 30 is fixed on the steering post 12. Journalled within the brackets 29 and 30 is a control lever 31 having a hand engaging portion 32 thereon. The portion 32 of the control lever 31 is placed adjacent to the steering wheel so that the lever may be easily manipulated.

The lower forward end of the control lever 31 is provided with an arm 33. The arm 33 is connected to the clevis 28 by means of a link 34. The link 34 is pivotally connected to the clevis 28 and is connected to the arm 33 by means of a ball and socket joint (not shown).

From the construction of the parts just described it will be seen that the rotation of the lever 31 will impart sliding movement to the tie rod 26 which in turn will cause rotation of the vehicle lights 23.

In order to tilt the vehicle light 23 on a horizontal axis, I provide a shaft 35 which is journalled in the brackets 29 and 30. The shaft 35 is provided with a hand engaging portion 36. Fixed to the lower forward end of the shaft 35 is an arm 37.

A rod 38 is journalled in the bearing members 39 on the frame 10. Each of the ends of the rod 38 have fixed to them an arm 40. Formed on the bracket members 14 are the tubular guides 41. The guides 41 have slidably mounted in them the rods 42. The upper ends of the rods 42 are bifurcated as at 43. The lower ends of the rods 42 are pivotally connected to the free ends of the arms 40.

Fixed on the rod 38, between its ends, is the arm 44. The arm 44 and the arm 37 are connected together by a link 45. The link 45 is secured to the arm 37 and to the arm 34 by means of ball and socket joints.

Slidably mounted on the squared portion 18 of the rod 17 is a grooved collar 46. The bifurcated portion 43 is received within the grooved collar 46. The collar 46 is capable of vertical sliding movement on the squared portion 18 and rod 17.

The vehicle lights 23 are provided with an ear 47 while the collars 46 are provided with an ear 48. The ears 47 and 48 are connected together by means of a link 49.

From the construction of the parts just described it will be seen that when the lever 35 is rotated in the direction indicated by the arrow 50, the movement will cause the arms 40 on the rod 38 to move the rods 42 upwardly. The moving of the rods 42 upwardly will cause the collars 46 to be slid upwardly, which in turn, due to the link connections with the headlights 23, will cause the head lights to be tilted on the horizontal axis. When the lever 35 is moved in a direction opposite of that indicated by the arrow 50, it will cause the vehicle lights to be tilted in the opposite direction.

It will thus be seen that the vehicle lights are capable of tilting movement for throwing a light up or down as desired. It will also be seen that the vehicle lights may be rotated on a vertical axis by operation of the lever 31.

The grooved collar 46 and the bifurcated portion 23 permit the rotation of the vehicle headlights independently of their tilting position. In order to rotate the vehicle head lights on a vertical axis in unison with the movement of the front wheel of the automobile, I have provided the following described mechanism.

Mounted on the steering rod 13 is a gear 51 and on the lever 31 is a gear 52. In order to connect the gears 51 and 52 together, I provide a gear 53, which gear is mounted on a sliding bearing member 54. The bearing member 54 extends through the dash 11 and is provided with a hand engaging portion 55 on its free end. The gear 53 is slightly tapered so that it may be slid in between the gears 51 and 52 for connecting them together.

From the construction of the parts just described, it will be seen that when the gears 51 and 53 are in mesh with each other, the rotation of the steering rod 13 will impart rotation to the lever 31 in the same direction, which will cause the automatic operation of the vehicle head lights in unison with the steerable wheels of the automobile.

It will be seen that when the lights are used, as at night, the gear arrangement may be moved to position where they are operated for automatically rotating the vehicle lights. When the gear arrangement is disconnected the vehicle lights may be rotated manually by operation of the lever 31. It is sometimes desirable to rotate the vehicle lights even though the automobile is not being moved and such rotation can be easily accomplished by operation of the lever 31.

It will be seen that the lever 35 may be operated for tilting the lights regardless of the mode of operation of the vehicle lights for rotating them. It will be seen that my invention will prove very practical and very efficient.

It will readily be seen that it is quite advantageous to be able to tilt the lamps or lights so as to throw the light downward upon the road when passing another vehicle coming in the opposite direction. The possibility of turning the lights gives me the use of a bright light when driving and also enables me to throw the light upon the road when passing another car coming from the opposite direction and not in any way "blinding" the driver of the other car.

The possibility of rotating the lights makes it possible to follow road marks on the sides of the roads as is necessary when driving at night.

Some changes may be made in the construction and arrangement of the various parts of my device, without departing from the essential features and purposes of my invention, and it is my intention to cover by my claims, any modified forms of structure or use of mechanical equivalents, which may be reasonably included within their scope.

I claim as my invention:

1. A steerable headlight mechanism for automobiles including headlights rotatably mounted on vertical axes, and tiltably mounted on horizontal axes, means for rotating the lights, and means for tilting the lights without interfering with the rotating means, said tilting means including supporting forks for the lights, said supporting forks having shanks, grooved collars slidably mounted thereon, links connecting said collars to the rear of the lights, whereby vertical sliding movement of the collars will impart tilting movement to the lights, and means controllable from the dash for imparting sliding movement to the collars.

2. A steerable headlight mechanism for automobiles including headlights rotatably mounted on vertical axes, and tiltably mounted on horizontal axes, means for rotating the lights, and means for tilting the lights without interfering with the rotating means, said tilting means including a shaft inclined downwardly and forwardly of the dash of the automobile, an arm on the end of said shaft, a shaft rotatably mounted transversely in the forward part of the frame and adjacent the lights, an arm on said transverse shaft and adjacent the arm on the inclined shaft, a link connecting the two arms, the arms being so positioned relative to each other that rotation of the inclined shaft will impart rotation to the transverse shaft, and means operable by the rotation of the transverse shaft to tilt the lights vertically.

3. In combination with an automobile having a frame, a steering post, and dash, a steerable headlight mechanism including lights tiltably mounted in forks, the forks having shanks rotatably mounted in vertical sockets, means including a shaft mounted on the steering post for imparting rotating movement to the lights, and means for imparting tilting movement thereto, said means including a shaft mounted with one end convenient to the driver, a transverse shaft mounted in the forward part of the frame, means for imparting rotary reciprocating movement from the first shaft to the transverse shaft, and means for imparting tilting movement to the light from the transverse shaft.

Des Moines, Iowa, February 20, 1922.
WILLIAM I. INGLEDUE.